Patented June 12, 1923.

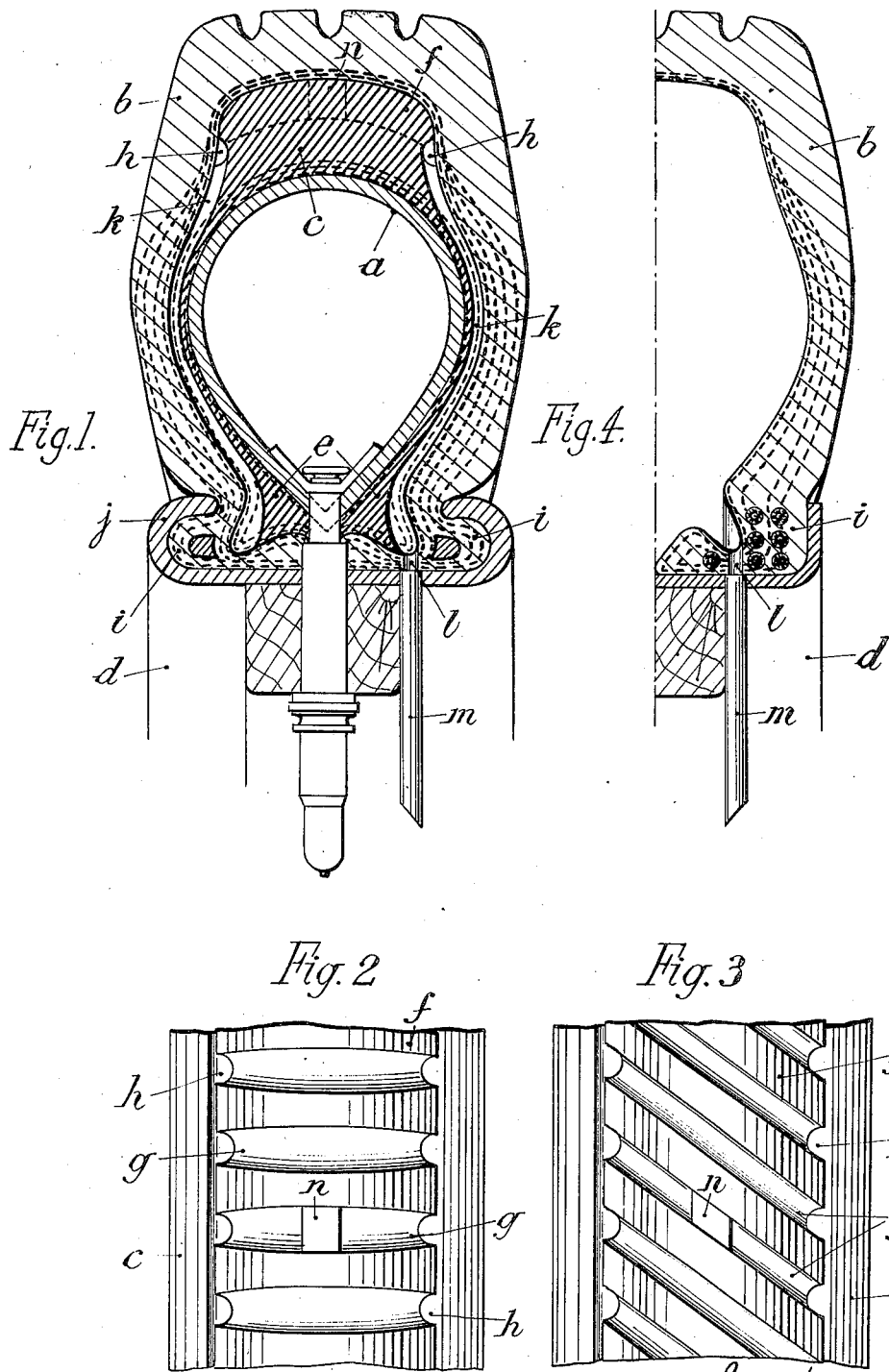

1,458,458

UNITED STATES PATENT OFFICE.

MARIE JOSEPH CAMILLE ANDRÉ, OF PARIS, FRANCE.

PNEUMATIC TIRE.

Application filed March 13, 1922. Serial No. 543,437.

*To all whom it may concern:*

Be it known that I, MARIE JOSEPH CAMILLE ANDRÉ, citizen of the Republic of France, and resident of 165 Rue de Tolbiac, Paris, in the said Republic, engineer, have invented certain new and useful Improvements in Pneumatic Tires; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a type of tire in which an envelope is placed between the external cover and the air tube, so that a greater thickness of rubber is interposed between the latter and the soil and prevents the tube from being pierced. Moreover, according to this invention, the whole tire is so designed that it is not likely to blow out. The tire is cooled in running by a continuous circulation of air inside. The tire is economical owing to the fact that the necessary resistance is mainly afforded by the intermediate envelope, and consequently a comparatively small quantity of fabric need be employed in the construction of the external cover, which is that part of the tire which must be the most often replaced. A further economy is realized by the fact that the air tube has a diameter less than is usually the case.

The present improvement has been especially contrived with a view to realizing economy in the cost of the external cover without sacrificing the resistance of the tire, and of securing an efficient circulation of air without making holes either in the tread or sides of the tire, thus preventing every risk of the inlet and outlet air openings becoming obstructed.

In some well known tires the intermediate envelope was provided with circumferential grooves and the flattening of the tire on the soil compressed the air in the hollow spaces thus formed between the envelopes. According to the invention, on the contrary, the air contained in the grooves is not imprisoned, and consequently is not compressed; the pressure on the soil serves to force the air in and out, and it is constantly replaced by cool air when the tire, by taking its normal shape, produces a section.

According to one form of embodiment of the invention the grooves at the external or peripheral surface or tread portion of the intermediate envelope are formed generally crosswise. They communicate together, on each side of the tire, by means of a groove which extends circumferentially and communicates with an opening or openings formed through the bead of the external cover and the felly rim of the wheel, thus permitting the air to circulate freely.

Figure 1 of the drawing is a transverse section of a tire constructed according to this invention and shown in position on the felly of a wheel.

Figure 2 is a plan view of part of the intermediate envelope, showing its cross grooves and the collecting grooves, and Figure 3 is a view similar to Fig. 2 showing a modification in which the cross grooves are arranged diagonally.

Figure 4 is a transverse section of part of an external cover in which the hook shaped edges are replaced by edges containing strengthening cables, adapted for use on a detachable rim.

In the drawing $a$ is the ordinary air tube, $b$ is the external cover, $c$ the intermediate envelope, $d$ the rim on which the tire is mounted.

The sides of the intermediate envelope are made of plies or layers of cloth, three by preference, combined with rubber. Near the lower part of each side a bead $e$ is formed containing a core made of hard rubber or the like, for the purpose of securing the intermediate envelope to the external cover $b$, which latter is provided with corresponding circular recesses. Having regard to cross-section as in Fig. 1, at the upper part of the internal cover $c$ is secured a crescent $f$ of rubber, of the shape shown, on the surface of which are formed transverse grooves $g$, rounded by preference, all of which open into a circular groove $h$ on each side of the tire, the circular groove communicating with the atmosphere as will be hereafter explained.

The external cover fits closely on the intermediate envelope and is secured thereto by means of circular recesses receiving the beads $e$. The external cover may be fixed to the rim in any ordinary way, for example, by means of hook shaped edges $i$ entering the turned over edges $j$ of the rim.

The sides of the external cover are by preference made of four plies or layers of cloth. At the tread and in the adjacent parts there are only two plies of cloth, upon which is a thick layer of rubber. Projections and hollows may be formed on the tread in the usual manner to avoid slipping.

In order that the two circular grooves $h$, $h$ in which the cross grooves $g$ open, may communicate with the atmosphere, a radial channel $k$ is formed, in the moulding process, either on the external surface of the intermediate envelope as shown or on the internal surface of the external cover, on each side of the tire, which groove extends from the circular groove $h$ to a hole $l$ formed in the bead $i$ of the external cover, and which communicates with a hole in the felly, continued by a small tube $m$.

When it is preferred to form the passage $k$ on the intermediate envelope, as shown, then it is formed in a band of rubber tapered at its edges which is cemented on the cloth.

The radial passages $k$, holes $l$, and tubes $m$ exist at a number of points of the circumference of the tire, in order to secure a communication from the circular grooves $h$ to the atmosphere. It is obvious that such a communication with the exterior at opposite points in the tire secures an efficient renewal of the air inside the latter and thus prevents the tire from overheating and thereby avoids blow-outs. Of course the number of air inlets and outlets and of corresponding channels, may be varied as desired.

A partition $n$ formed of a small block of rubber is arranged in each of the cross grooves $g$ in order to divide the current of air in view of securing the proper issue or admission of air through the corresponding tubes $m$.

I claim:

A pneumatic tire comprising an external cover having retaining beads formed with apertures, an intermediate envelope mounted in the cover and having a thick tread formed with transverse peripheral grooves which communicate with annular grooves formed in the sides of the tread, air passages connecting the annular grooves with the apertures in the cover, and yielding partitions centrally arranged in the transverse grooves operable during the running of the tire to cause an ingress and egress of air through the apertures.

In testimony that I claim the foregoing as my invention, I have signed my name.

MARIE JOSEPH CAMILLE ANDRÉ.